United States Patent
Stolze et al.

(10) Patent No.: US 11,893,041 B2
(45) Date of Patent: Feb. 6, 2024

(54) DATA SYNCHRONIZATION BETWEEN A SOURCE DATABASE SYSTEM AND TARGET DATABASE SYSTEM

(71) Applicant: INTERNATIONAL BUSINESS MACHINES CORPORATION, Armonk, NY (US)

(72) Inventors: Knut Stolze, Hummelshain (DE); Vassil Radkov Dimov, Stuttgart (DE); Christian Michel, Sindelfingen (DE); Daniel Martin, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 16/830,696

(22) Filed: Mar. 26, 2020

(65) Prior Publication Data
US 2020/0364241 A1    Nov. 19, 2020

(30) Foreign Application Priority Data
May 15, 2019    (EP) .................................... 19174608

(51) Int. Cl.
*G06F 16/27* (2019.01)
*G06F 16/178* (2019.01)
*G06F 16/23* (2019.01)

(52) U.S. Cl.
CPC .......... *G06F 16/275* (2019.01); *G06F 16/178* (2019.01); *G06F 16/2365* (2019.01); *G06F 16/27* (2019.01)

(58) Field of Classification Search
CPC .... G06F 16/178; G06F 16/273; G06F 16/275; G06F 16/27; G06F 16/2365
See application file for complete search history.

(56) References Cited

U.S. PATENT DOCUMENTS

| | | | |
|---|---|---|---|
| 6,434,568 B1 | 8/2002 | Bowman-Amuah | |
| 7,117,221 B2 | 10/2006 | Hahn | |
| 9,501,501 B2 | 11/2016 | Madhavarapu et al. | |
| 10,180,946 B2 | 1/2019 | Brodt et al. | |
| 11,487,714 B2 * | 11/2022 | Beier | G06F 16/1805 |
| 2006/0047626 A1 * | 3/2006 | Raheem | G06F 11/1469 |
| | | | 714/E11.122 |
| 2011/0099149 A1 | 4/2011 | Kim | |

(Continued)

FOREIGN PATENT DOCUMENTS

CN    109241175 A    1/2019

OTHER PUBLICATIONS

Ben-Gan et al., "Aggregating and Pivoting Data," Chapter 6, Inside Microsoft SQL Server(D cent-symbol) 2005: T-SQL Querying 2006, Microsoft Press, p315+Bib Data, pp. 315-380.

(Continued)

*Primary Examiner* — Marcin R Filipczyk
(74) *Attorney, Agent, or Firm* — Anthony M. Pallone

(57) ABSTRACT

The present disclosure relates to a method for data synchronization between a source database system and target database system, wherein execution of a database transaction of the source database system is complete if a processing step followed by an application step of the database transaction is performed. For each identified database transaction, a processing step and/or application step may be performed.

15 Claims, 4 Drawing Sheets

(56) References Cited

U.S. PATENT DOCUMENTS

| | | | |
|---|---|---|---|
| 2016/0147859 A1* | 5/2016 | Lee | G06F 11/1471 |
| | | | 707/615 |
| 2016/0328461 A1 | 11/2016 | Ahmed | |
| 2017/0185493 A1 | 6/2017 | Graefe | |
| 2017/0308602 A1* | 10/2017 | Raghunathan | G06F 16/273 |
| 2017/0329836 A1 | 11/2017 | Simitsis et al. | |
| 2017/0364571 A1 | 12/2017 | Lu | |
| 2018/0046554 A1 | 2/2018 | Griffith et al. | |
| 2019/0171650 A1* | 6/2019 | Botev | G06F 16/2358 |
| 2019/0361913 A1 | 11/2019 | Yoon | |
| 2020/0034077 A1* | 1/2020 | Haravu | G06F 3/067 |
| 2020/0042183 A1* | 2/2020 | Meiri | G06F 3/065 |
| 2020/0272603 A1 | 8/2020 | Matters | |
| 2021/0103502 A1 | 4/2021 | Gurajada | |

OTHER PUBLICATIONS

Microsoft KB Archive/238254, Inf: Update Statements May be Replicated as DELETE/INSERT Pairs, Nov. 21, 2003, betaarchive. com, https://www.betaarchive.com/wiki/index.php?title=Microsoft_KB_Archive/238254, 2 pages.

Pitr-Ch, "Thread Pools," Aug. 13, 18, Github, https://github.com/ruby-concurrency/concurrent-ruby/blob/master/docs-source/thread_pools.md, 7 pages.

Stack Exchange, What is a thread pool? Software Engineering Stack Exchange, Accessed: Sep. 21, 2021, https://softwareengineering.stackexchange.com/questions/173575/what-is-a-thread-pool, 4 pages.

ibm: List of IBM Patents or Patent Applications Treated as Related (Appendix P), Mar. 27, 2020, pp. 1-2.

Pending U.S. Appl. No. 16/830,570, filed Mar. 26, 2020, entitled: "Method for Data Replication in a Data Analysis System", pp. 1-37.

Pending U.S. Appl. No. 16/830,624, filed Mar. 26, 2020, entitled: "Method for Data Synchronization in a Data Analysis System", pp. 1-37.

Oracle, "Oracle GoldenGate", printed Jan. 22, 2020, 6 pages, https://www.oracle.com/middleware/technologies/goldengate.html.

PostgreSQL, "Documentation: 9.1: Log-Shipping Standby Servers", Nov. 14, 2019, Chapter 25, High Availability, Load Balancing, and Replication, 3 pages.

Holliday et al., "Database Replication Using Epidemic Communication", Euro-Par 2000, LNCS 1900, pp. 427-434, 2000.

Beier et al., "Method for Data Replication in a Data Analysis System," European Application No. 19174602.3, Application and Drawings, 31 pages.

Martin et al., "Method for Data Synchronization in a Data Analysis System," European Application No. 19174606.4 , Application and Drawings, 31 pages.

Stolze et al., "Method for Data Synchronization Between a Source Database System and Target Database System," European Application No. 19174608.0, Application and Drawings, 34 pages.

Kholsa, "Database Net Services Administrator's Guide," Oracle Sys, 12c, Release 1, Jul. 2017, https://docs.oracle.com/database/121/NETAG/dispatcher.htm#/NETAGO12, 5 pages.

* cited by examiner

DATA SYNCHRONIZATION BETWEEN A SOURCE DATABASE SYSTEM AND TARGET DATABASE SYSTEM

BACKGROUND

The present invention relates to the field of digital computer systems, and more specifically, to a method for data synchronization between a source database system and target database system.

Many systems exist for moving data from one relational system to another. These systems can be classified into two categories: full refresh systems that copy entire data sets and change data capture (CDC) systems that optimize transfers by applying changes only. CDC systems enable a change data capture service that only the data in a source system of the CDC system that has actually changed are updated in a target system of the CDC system.

BRIEF SUMMARY

Various embodiments provide a method for data synchronization between a source database system and target database system, computer system and computer program product as described by the subject matter of the independent claims. Advantageous embodiments are described in the dependent claims. Embodiments of the present invention can be freely combined with each other if they are not mutually exclusive.

In one aspect, the invention relates to a method for data synchronization between a source database system and target database system, wherein execution of a database transaction of the source database system is considered to be complete if a processing step followed by an application step of the database transaction is performed. The method comprises:
   a) identifying in a time interval (or a current time interval) one or more database transactions of the source database system;
      and for each transaction of the identified database transactions:
   b) in response to determining that said transaction is not completed:
      b1) causing the target database system to perform the processing step of said transaction;
   c) in response to determining that said transaction is completed:
      c1) causing the target database system to perform the processing and the application steps of said transaction if step b1) was not previously executed for said transaction, otherwise
      c2) causing the target database system to perform the application step of said transaction.

In another aspect, the invention relates to a control system (or computer system) for data synchronization between a source database system and target database system, wherein execution of a database transaction of the source database system is considered to be complete if a processing step followed by an application step of the database transaction is performed. The control system is configured for:
   a) identifying in a time interval one or more database transactions of the source database system;
      and for each transaction of the identified database transactions:
   b) in response to determining that said transaction is not completed:
      b1) causing the target database system to perform the processing step of said transaction;
   c) in response to determining that said transaction is completed:
      c1) causing the target database system to perform the processing and the application steps of said transaction if step b1) was not previously executed for said transaction, otherwise
      c2) causing the target database system to perform the application step of said transaction.

In another aspect, the invention relates to a computer program product comprising a computer-readable storage medium having computer-readable program code embodied therewith. The computer-readable program code is configured for data synchronization between a source database system and target database system, wherein execution of a database transaction of the source database system is considered to be complete if a processing step followed by an application step of the database transaction is performed. The computer-readable program code is further configured for:
   a) identifying in a time interval one or more database transactions of the source database system;
      and for each transaction of the identified database transactions:
   b) in response to determining that said transaction is not completed:
      b1) causing the target database system to perform the processing step of said transaction;
   c) in response to determining that said transaction is completed:
      c1) causing the target database system to perform the processing and the application steps of said transaction if step b1) was not previously executed for said transaction, otherwise
      c2) causing the target database system to perform the application step of said transaction.

BRIEF DESCRIPTION OF THE DRAWINGS

In the following embodiments of the invention are explained in greater detail, by way of example only, making reference to the drawings in which.

DETAILED DESCRIPTION

Figure 1A:
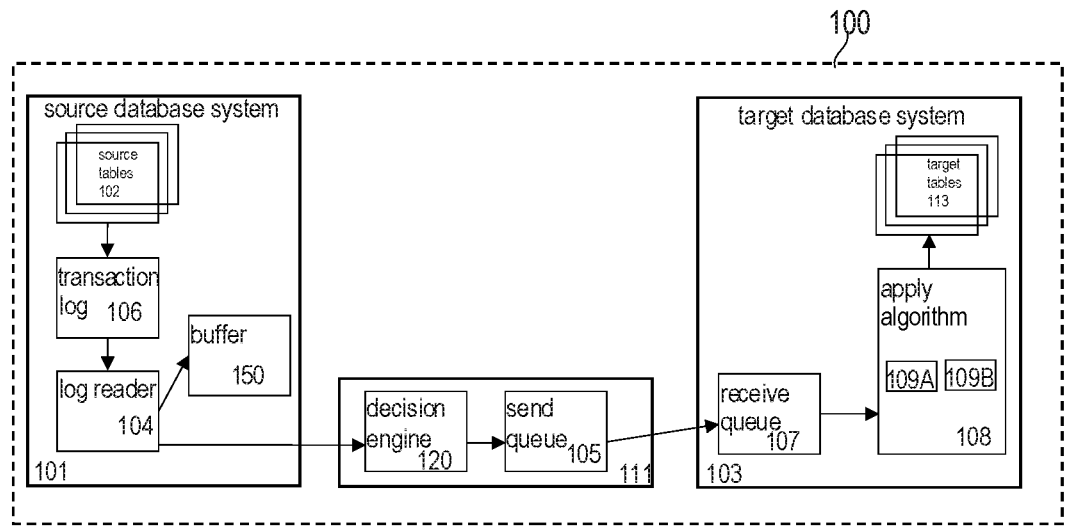
FIG. 1A is a block diagram of a data processing system, in accordance with an embodiment of the invention.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

By applying, using a first data synchronization technique, only committed changes, the synchronization process may require the gathering of all data changes belonging to a transaction on the source database system, before it can be applied on the target database system. However, this may induce latency in particular for long running transactions involving many data changes. This may also result in unequal system utilization on the target database system. The present subject matter may enable an optimized synchronization process, by applying accumulated changes including both uncommitted and committed changes to the target database system. For example, by starting to apply transactions to the target database system earlier (before being committed), the overall latency can be reduced significantly. Thus, the present subject matter may reduce the time required for data replication between source and target database systems. This may particularly be advantageous as most of the target database systems may have a very low data roll back frequency. This is because database applications typically try to avoid rollbacks, as a rollback itself has a high cost on the transactional system itself, especially for large transactions.

The data replication in accordance with the present subject matter may provide low impact capture and fast delivery of data changes for key information management initiatives including dynamic data warehousing, master data management, application consolidations or migrations, operational BI, and enabling SOA projects. The replication may also help reducing processing overheads and network traffic by only sending the data that has changed. The present method may automatically be executed upon logging changes in the transaction log. This may enable to keep the source and target database systems to be synchronized on a regular basis. This may particularly be advantageous in case the system experiences frequent changes to large volumes of data. The data replication in accordance with the present subject matter may for example be performed by capturing the changes using a batch transfer, wherein the batch can be configured to increase or decrease the frequency of data replication.

For example, the method may be performed by a control system that is remotely connected to the source database system and to the target database system. This may enable a remote control of the data synchronization and a centralized control of multiple pairs of source and target database systems. The control system may provide a third party service that can be used by normal users. Instead of requiring resources at both the source and target systems, the present subject matter enables to centralize the computing efforts at one point. Also, using a remote control system to control the data synchronization processes in the system may minimize the amount of pre-installations and configurations that may need to be performed in case of a decentralized execution of the method.

A database transaction may refer to a unit of work performed against a database. A database transaction may be treated in a coherent and reliable way independent of other transactions. A database transaction generally represents any change in a database. For example, a database transaction may be issued to the database system in a language like SQL wrapped in a transaction, using a pattern having the following steps: s1) Begin the transaction, s2) Execute a set of data manipulations and/or queries, s3) If no errors occur then commit the transaction and end it and s4) If errors occur then roll back the transaction and end it. A transaction commit operation applies all data manipulations within the scope of the transaction and persists the results to the database. The processing step of the database transaction as described herein may be the steps s1) and s2) of the pattern, while the application step is the commit of the transaction so as to end the transaction.

A log record refers to log information descriptive of a change induced by one or more operations of a database transaction performed on one or more data records of a source table of a database. For example, the log information is provided such that it can be used by the target database system to apply the same change on a target table that corresponds to the source table e.g. if before applying the change to the source table, both the source and target tables have the same content, the log information may be provided such that the same change can be applied on the target table and the resulting target table has the same content as the changed source table by said change. The log information may, for example, comprise general log attributes and other attributes depending on the type of change associated with the log record. The general log attributes may, for example, comprise a log record sequence number (LRSN) which is a unique ID for a log record indicating the logical order of the change, a transaction ID number which is a reference to the database transaction generating the log record. The other attributes may comprise, for example for an update change type, a page ID indicating the Page ID of the modified page, a length and offset of the page, before and after images which include the value of the bytes of page before and after the page change. The page may comprise one or more data records of the database. The before and after images may comprise values of that one or more data records before and after the change is applied respectively. Each data record that is referenced by the log record may be comprised of multiple attributes. Said data record may be uniquely identified, e.g., via an ID attribute, a set of key attributes in the corresponding database table, etc.

A data record or row is a collection of related data items such as a name, date of birth and class of a particular user. A data record represents an entity, wherein an entity refers to a user, object, or concept about which information is stored in the data record. The data records may be stored in a graph database as entities with relationships, where each record may be assigned to a node or vertex of the graph with properties being attribute values such as name, date of birth etc. The data records may, in another example, be data records of a relational database.

For example, the data analysis system (or data processing system) may be a data warehousing system or master data management system. The data analysis system may enable data warehousing or master data management or another technique that uses a source and target database systems, wherein the target database system comprises a target database that is configured to receive/comprise in accordance with technique a copy of a content of a corresponding source database of the source system. The source database system may be connected to the target database system via a connection. The connection may for example be a TCP/IP connection or another connection enabling the communication of data via the connection between the source database and the target database system. The source database system may be a transactional engine and the target database system may be an analytical engine. For example, the source database system may be an online transaction processing (OLTP) system and the target database system may be an online analytical processing (OLAP) system.

According to one embodiment, the source database system comprises a transaction log for logging the database transactions of the source database system and a log reader for reading the transaction log, buffering in a buffer the read data for enabling change replication to the target database system, wherein step b) further comprises controlling the log reader to remove buffered data descriptive of the processing step of said transaction. This embodiment may save processing resources such as storage resources that would otherwise be required for processing the non-removed entries of the buffer.

According to one embodiment, step c1) comprises invoking a main thread of a transaction process of the target database system and each of steps b1) and c2) comprises invoking an additional thread of the transaction process, the transaction process being configured to execute transactions in the target database system. This may enable a seamless integration of the present method with pre-configured systems such as a target database system having the main thread that manages the first technique. This method may add the additional thread to the target database system to enable the execution of at least part of the present method. For example, steps b1) and c2) may be executed by respective additional threads of the transaction process. Step c1) may be executed by the main thread.

According to one embodiment, steps b) to c) are performed in parallel for the identified database transactions. This may further reduce the time delays in data synchronization processes. This may particularly be advantageous in case the identified transactions are independent of each other. Step b) comprises step b1) (e.g. as a sub-step) and step c) comprises steps c1) and c2) (e.g. as sub-steps). Executing step b) comprises executing step b1). Executing step c) comprises executing steps c1) and c2). The transaction that is processed in step b1) or c2) may be referred to as a pre-apply transaction because it is processed in the target database system before being committed in the source database system.

According to one embodiment, the completion of each database transaction for a respective database in the source database system results in a specific content of the database, wherein steps c1) and c2) are performed only if a resulting content of each database affected by said transaction in the target database system is one of the specific contents. In other terms, each time when a commit happens on the target database it exactly represents a consistent database log position (state) of the source database. A dependency between two transactions may for example be established when both transactions change (e.g. update or delete) the same data record. This embodiment may ensure the consistency of data on the source and the target database.

According to one embodiment, the source database system is configured to perform the processing and application steps for different transactions in a given order taking into account the dependencies between data transactions to prevent data inconsistency, wherein each of step b) and step c) further comprises: determining if at least one another transaction of the identified database transactions is dependent on said transaction, and if so performing steps b1) and c1) if said transaction occurred before the application step of each of the at least one other transaction, otherwise performing steps b1) and c1) after steps b) to c) are executed for the other transactions. This embodiment may enable that the pre-apply transaction in not wrongly impacted by the execution of other transactions committed during the execution of the pre-apply transaction.

This may enable that all changes from a pre-apply transaction which can be found in the transaction log before a commit from another transaction can be immediately performed on the target database system. This is possible because the source database system is already (pre)configured to take into account dependencies so that a source database commit ensures that already executed operations of other transactions do not have interdependencies. In contrary, all changes from a pre-apply transaction which can be seen in the transaction log after a commit from another transaction can be applied only after the changes of the committed dependent transaction has been applied.

According to one embodiment, the source database system comprises a transaction log for logging the database transactions, wherein identifying the database transactions is performed using the transaction log. The transaction log may for example be written to disk or other storage means in a batch, either when resources are available or when scheduled.

According to one embodiment, step b) is only performed if the duration and/or size of said transaction fulfill a predefined condition (pre-apply condition). For example, step b) may be executed only for long running transactions. A long running transaction may be a transaction whose duration is higher than a maximum duration threshold. Additional or alternatively, when the size of data involved in a transaction (e.g. the size of the log record associated with the transaction) is higher than a size threshold, step b) may be performed for that transaction. This embodiment may enable an optimistic data synchronization technique which can deal differently with long running transactions and drastically reduce the negative impact of those. Thus, this may reduce the latency peaks of the synchronized system and ensure more balanced overall system utilization.

According to one embodiment, the method further comprises tagging each of the one or more database transactions as committed or uncommitted database transaction, wherein determining that said transaction is completed comprises determining that said transaction is tagged as a committed database transaction, wherein determining that said transaction is not completed comprises determining that said transaction is tagged as a uncommitted database transaction. This may enable a systematic and automatic execution of the present method which may scale with the number of transactions.

According to one embodiment, the method further comprises repeatedly performing steps a) to c), wherein in each iteration the time interval is subsequent time interval of the time interval of its preceding iteration.

According to one embodiment, the method further comprises, in response to determining that said transaction is cancelled, determining if step b1) is performed for said transaction but not yet step c2), and if so causing the target database system to roll back the result of the processing step of said transaction.

According to one embodiment, steps a) to c) are performed in accordance with a batch processing having scheduling time intervals, wherein the time interval is a time scheduling interval of the batch processing.

For example, the batch processing may use micro batches. A micro batch may be defined by a certain duration of the scheduling time intervals. The duration may be smaller than a predefined maximum duration. For this scheduling time interval the log reader may buffer all committed and uncommitted changes occurred during that time interval. All transactions that are committed during the micro-batch can be applied on the target database as well. Transactions which are still running at the end of the micro-batch, on the other hand can be pre-applied e.g. as describe herein with steps b1) and c2). The pre-application may be performed if the pre-apply condition is met. By observing transactions in the context of a micro-batch gives the opportunity to decide if changes can be immediately applied or should be delayed for consistency purposes.

FIG. 1A is a block diagram of a data processing system (or data analysis system) 100 in accordance with an example of the present subject matter. The data processing system 100 may be configured for data synchronization between a source database system 101 and target database system 103 in accordance with an example of the present subject matter. The source database system 101 may, for example, be an online transaction processing (OLTP) system. The target database system 103 may for example, be an online analytical processing (OLAP) system. In one example, the data processing system 100 may be a CDC system 100.

The source database system 101 comprises one or more source tables 102, a transaction log 106 and a log reader 104. Source tables 102 can be relational tables in DB2® for z/OS®, DB2 for Linux, UNIX, and Windows, and Oracle. The transaction log 106 is maintained by the source database system 101 for its own recovery purposes.

The target database system 103 comprises a receive queue 107, an apply program 108 and one or more target tables 113. The apply program 108 includes a browser thread 109A and multiple agent threads 109B. The agent threads 109B may be used for processing transactions at the target database system 103.

The browser thread 109A may be configured to get messages from receive queue 107 and pass the messages to one or more agent threads 109B to be applied to the target the database system 103. The receive queue 107 may be populated with submitted log records the source database system 101 and is to be used as the source of changed data to be applied to tables 113 of the target database system 103.

The entries or log records of the transaction log 106 describe changes to rows of the source tables 102 at the source database system 101. More specifically, the entries in the transaction log 106 may for example contain information defining (1) the table being changed, (2) the value of the key column in the row being changed, (3) the old and new values of all columns of the changed row, and (4) the transaction (unit of work) causing the change. By definition, an insert is a new data record and therefore has no old values. For delete changes, there is by definition no new data record, only an old data record. Thus, transaction log entries for inserted rows may contain only new column values while transaction log entries for deleted rows may contain only old column values. Transaction log entries for updated rows may contain the new and old values of all row columns. The order of entries in the transaction log reflects the order of change operations of the transactions and the order of transaction commit records reflects the order in which transactions are completed. The type of row operations in transaction log records can be delete, insert or update.

Figure 1B:
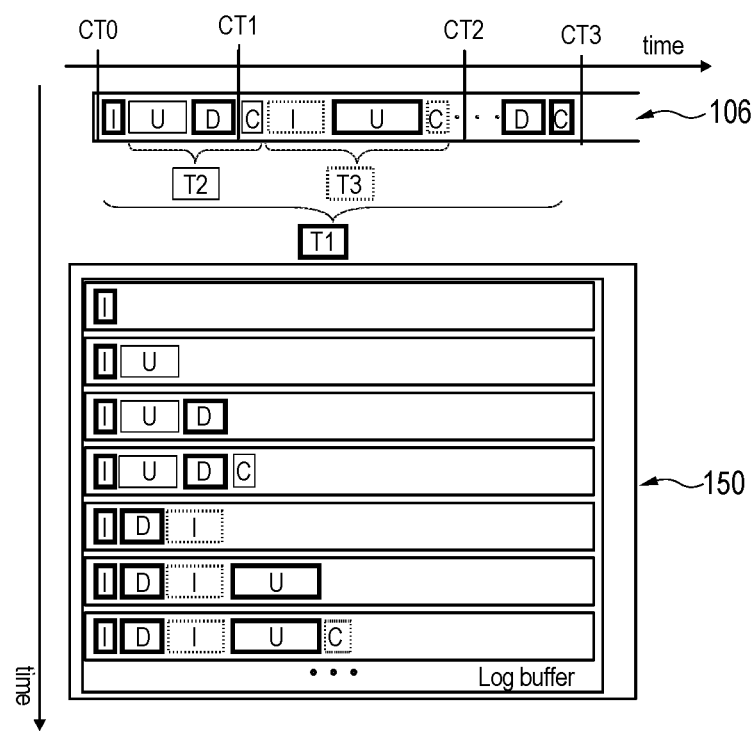
FIG. 1B is a diagram illustrating the logging of changes, in accordance with an embodiment of the invention.

The format of a transaction log record can be abstracted as shown in FIG. 1B. In the example of FIG. 1B three transactions T1, T2 and T3 are shown. Each transaction may consist of one or more multiple processing operations (e.g. insert, update, delete, etc.) followed by a commit operation, each of which is sequentially producing log records into the transaction log 106 once an operation has been executed.

The operations of a same transaction have are represented by boxes having respective line structures. T3 is associated with boxed of dashed lines, T2 is associated with boxes of thin lines and T1 is associated with boxes of thick lines. For example, as illustrated in FIG. 1B, the transaction T1 consists of an insert operation (represented as I), followed by a delete operation (represented as D), followed by an update operation (represented as U), followed by a delete operation which is then followed by a commit operation (represented as C). The transaction T2 consists of an update operation followed by a commit operation. The transaction T3 consists of an insert operation followed by a commit operation. As indicated in FIG. 1B, T2 and T3 are short transactions compared to transaction T1 which may be considered as a long transaction. The starting time of the transaction T1 is indicated by point of time CT0. At each point of time e.g. CT1 and CT2, the transaction log comprises log records of changes that occurred until that point of time.

The log reader 104 is configured to read changes of transactions from the transaction log 106. The log reader 104 may further be configured to buffer all operations of a transaction in a buffer 150. As shown in FIG. 1B, log records produced by each operation are saved in the buffer 150 following the order in which the operations occur. For example, the log records of the insert operation of transaction T1 are first saved followed by log records of update operation of the transaction T2 and so on. The log records of a transaction may be maintained in the buffer 150 until the log reader 104 reads the corresponding commit operation for this transaction and controlling the target database system 103 to apply the committed operation. In another example, a log record of a transaction may be maintained in the buffer 150 until a decision to replicate the changes caused by the transaction is performed (e.g. even before a corresponding commit operation is performed). This may save processing resources such as storage resources and monitoring resources required to monitor those kept entries by the log reader 104.

Only after a decision is made by a decision engine 120 of a control system 111, at least part of a transaction of the current transactions e.g. T1 to T3 may be sent to the target database system 103, where the corresponding changes will start to be applied. The at least part of the transaction may comprise the one or more processing operations (e.g. without the commit operation) of the transaction. In another example, the at least part of the transaction may comprise the whole transaction namely the one or more processing operations of the transaction and the commit operation. The transactions may be sent to the apply program 108 running on the target database system 103 using the control system 111. The decision to propagate a transaction to the target database system 103 may be performed by the decision engine 120 using control information. The control information may be read by or received from the buffer 150 by the decision engine 120. The control information may for example include for each transaction, but is not limited to: the name of the table being affected by the transaction, the size of data involved in the transaction, the current duration (time spent so far by the transaction) of the transaction. Thus, depending on the decision, committed and/or uncommitted transactions at the source database system 101 may be moved and applied to the target database system 103 in accordance with the present subject matter.

Sending a transaction to the target database system 103 may comprise sending instructions and/or data required for implementing the changes of the transaction on one or more tables of the target database system 103 such that the implementation results in a content of the target tables that is the same as the content of the corresponding table(s) of the source database system 101. For example, sending a transaction may comprise sending a log record generated by said transaction. The source database system may have a data record structure that is different from data record structure of databases of the target database system. In this case, before sending a log record transforming the data structure of one or more data records of the log record, resulting in a transformed log record, and sending the transformed log record. For example, the data in the source database system may be stored in a row format and the data stored in the target database system may be stored in a column format. The transformation may for example be performed so as to transform the format from a row to column format. By converting the format of the data records at this stage, the application of the log records at the target database system may require less processing resources that would otherwise be required if the said data records is to be transformed at the target database system. The conversion also enables to perform the data replication n e.g. without such a conversion the application of log records at the target database system may fail. Transactions may be sent via logical message units on recoverable queues (e.g. send queue 105 and receive queue 107) designated in the copy control tables for the table copies of the log records. This may for example be performed using IBM MQ service which can transport any type of data as messages. This may be advantageous as the service may work with a broad range of computing platforms, applications, web services and communications protocols for security-rich message delivery.

The control system 111 is shown as part of the data processing system 100 for exemplification purpose. In another example, the control system 111 may be a remote system of the data processing system 100. For that, the control system 111 may be configured to connect to the data processing system 100 via a medium of wireline and/or wireless digital data communication, e.g., a communication network. Examples of communication networks include a local area network (LAN), a wide area network (WAN), a wireless local area network (WLAN), all or a portion of the Internet, and/or any other communication system or systems at one or more locations. For example, the control system 111 may be configured to connect to the source database system 101 and to the target database system 103 as a system administrator of the source database system 101 and the target database system 103 respectively.

Figure 2:
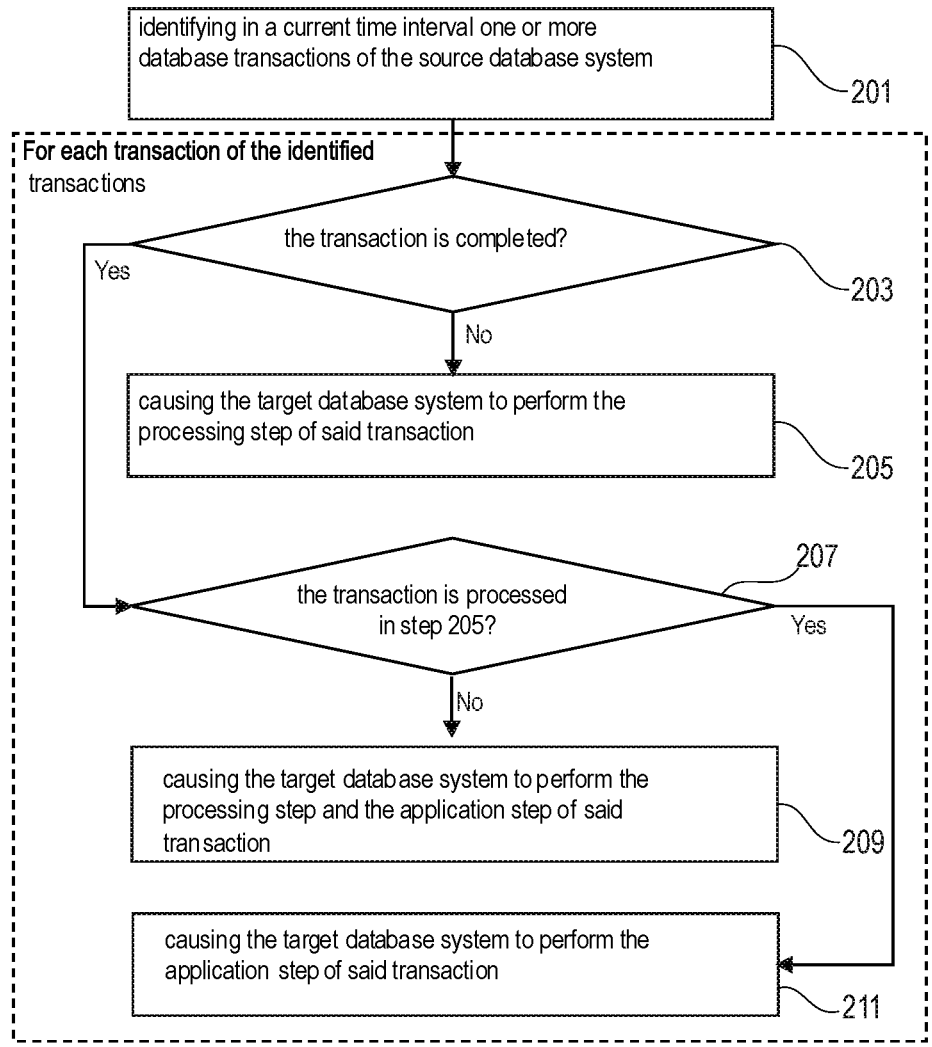
FIG. 2 is a flowchart of a method for data synchronization between a source database system and target database system, in accordance with an embodiment of the invention.

FIG. 2 is a flowchart of a method for data synchronization between a source database system (e.g., source database system 101) and a target database system (e.g., target database system 103). The method may for example be performed by the control system 111.

Database transactions of the source database system may be identified in step 201. For that, a time interval may be defined. The time interval may for example be a current time interval e.g. the current time interval may comprise a time point at which step 201 may be performed. The time interval may be defined by an end point of time and a start point of time. The end point of time may be the current point of time e.g. the time at which the control system 111 may search or identify existing transactions in step 201. The start point of time may be the previous end point of time e.g. the time at which the control system 111 has lastly performed step 201. In another example, the start point of time may be the end time of the last transaction that has been sent to the target database system. Following the example of FIG. 1B, if the current point of time is CT1 which lies after the delete operation of transaction T1 and before the commit operation of T2, the current time interval may for example be defined by the starting time of the transaction T1, CT0 and the current point of time CT1. In this case, the transactions T1 and T2 may be identified (T3 did not start yet at CT1) as they started already in the current time interval [CT0, C1].

For each transaction of the identified transactions, steps 203-211 may be performed. In inquiry step 203, it may be determined if the transaction is completed or not. A transaction is completed or ended if the application step (commit operation) of the transaction is performed.

In case the transaction is not completed, the target database system may be controlled or caused in step 205 to perform the processing step of said transaction. For example, in step 205, the target database system may receive e.g. from the control system, a request to perform the processing step of said transaction and upon receiving the request the target database system may perform the processing step of said transaction. The request may comprise information that can be used by the target database system to perform the processing step. In one example, step 205 may unconditionally be performed for each transaction of the identified transactions that is not completed. This may enable a systematic and less resource demanding method compared to a condition based method. In another example, step 205 may be performed under a predefined pre-apply condition. The pre-apply condition may for example require that the time taken so far (duration) by the uncommitted transaction is long enough and/or the size of the data involved in the transaction is high enough so that step 205 may be performed. For example, the pre-apply condition may comprise: if the duration of an uncommitted transaction is higher than a duration threshold and/or the size of the data involved by the transaction is higher than a predefined size threshold, then step 205 may be performed for that uncommitted transaction. Following the example of FIG. 1B, at the time CT1, both T2 and T1 are not completed yet. In this case, the target database system may be controlled to perform the update operation of the transaction T2 and the insert, delete, update and delete operations of the transaction T1. However, if the pre-apply condition is considered, some transactions may not be prorogated before being committed. For example, if the pre-apply condition is fulfilled by both transactions T2 and T1, then step 205 may be performed for both T2 and T3. In another example, if the duration of T1 at CT1 is longer than the duration threshold and the duration of T2 is smaller than the duration threshold, then step 205 may be performed for T1 but not for T2.

In case the pre-apply condition is not fulfilled by any of the identified transactions, then another time interval may be chosen, e.g. the control system may wait a bit of time and perform step 201 again at another point of time CT2 that is later than CT1. In this case, the current time interval can be [CT1, CT2].

In case (inquiry step 203) the transaction is completed (or committed), it may be determined in inquiry step 207 if step 205 has been previously performed for the transaction. This may for example occur if the method is previously processed on transactions of a previous time interval. In case step 205 is not executed for the transaction, the target database system may be configured in step 209 to perform both the processing and the application steps of the transaction. Following the example of FIG. 1B, at time CT2 the transactions T2 and T3 have been completed, but not transaction T1 this means that step 205 may be executed for transaction T1 and step 209 may be executed for transactions T2 and T3. For example, in step 209, the target database system may receive e.g. from the control system, a request to perform both the processing and the application steps of said transaction and upon receiving the request the target database system may perform both the processing and the application steps of said transaction. The request may comprise information that may be used by the target database system to perform both the processing and the application steps of the transaction.

In case step 205 is executed for the transaction, the target database system may be configured in step 211 to perform the application step of said transaction e.g. to complete the transaction, since the processing step of the transaction is previously performed. For example, in step 211, the target database system may receive e.g. from the control system, a request to perform the application steps of said transaction and upon receiving the request the target database system may perform the application step of said transaction. The request may comprise information that may be used by the target database system to perform the application step of the transaction.

In one example, the method of FIG. 2 may further comprise submitting an information to the target database system to indicate which one of the pre-apply transactions of the time interval have been committed. This may cause, the target database system to perform the application step of these pre-apply transactions. For example, the control system may further be configured to monitor each of these pre-apply transactions and as soon as a pre-apply transaction is committed in the source database system, the control system may send that information or cause the target database system to perform the application step of the pre-apply transaction that has been monitored and identified as being committed. For example, in case there is no transaction identified in the time interval of step 201, a subsequent time interval e.g. [CT1, CT2] may be chosen and steps 201-211 may be performed on the new time interval [CT1, CT2].

Figure 3A:
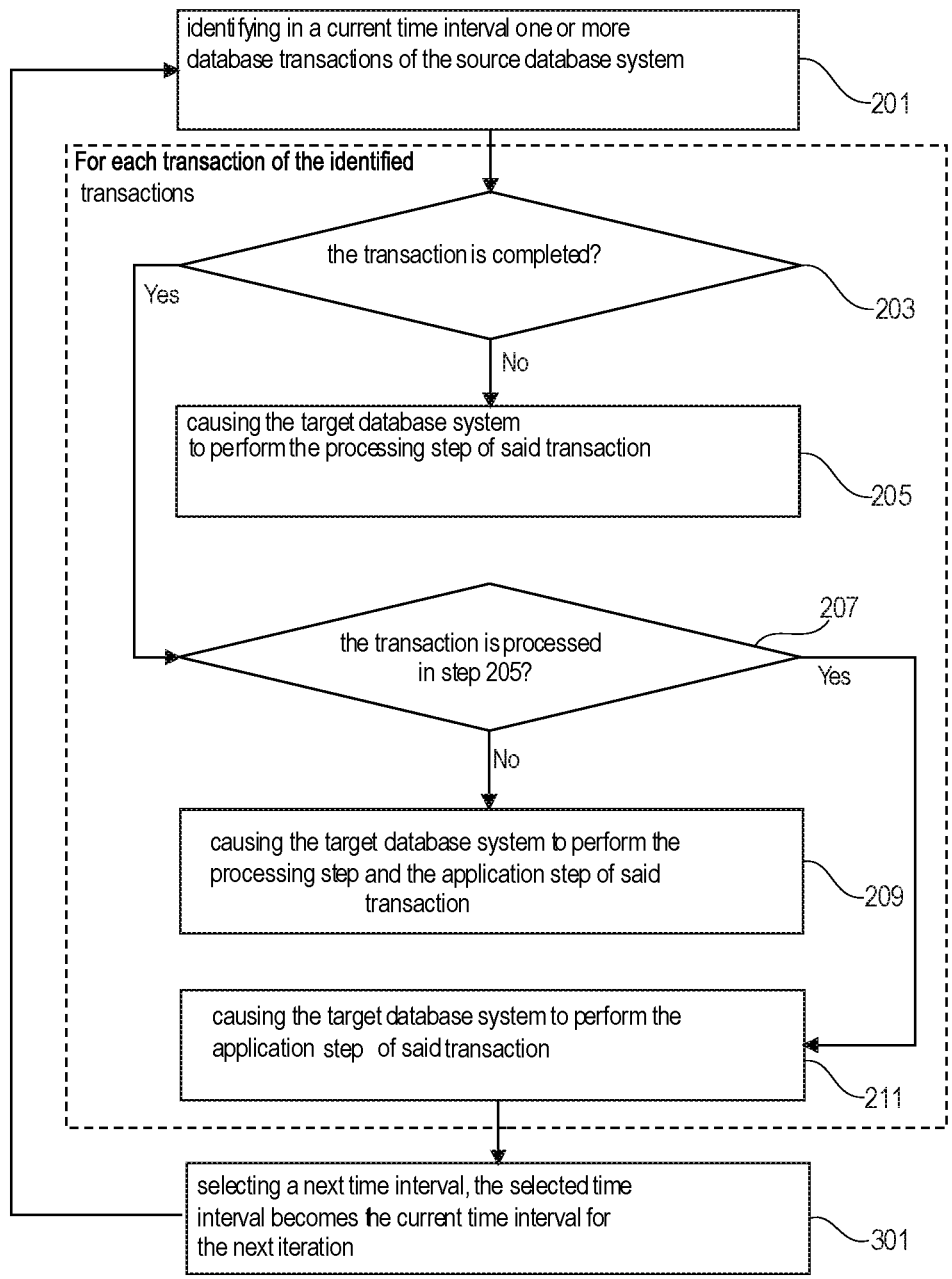
FIG. 3A is a flowchart of a method for data synchronization between a source database system and target database system, in accordance with an embodiment of the invention.

FIG. 3A is a flowchart of a method for data synchronization between a source database system (e.g., source database system 101) and a target database system (e.g., target database system 103). The method of FIG. 3A comprises steps 201 to 211 of the method of FIG. 2. The method of FIG. 3A further comprises step 301. In step 301, another time interval is selected. The selected time interval may be a subsequent interval of the time interval used in step 201. For example, if the first execution is performed on time interval [t0, t1], the first iteration may be performed on subsequent time interval [t1, t2] and so on. The subsequent time intervals may or may not have the same duration/length as a previous time interval. Having time intervals with the same length may enable a coherent processing where processing resources such as storage, network etc. are consistently used between the time intervals. Having time intervals with different lengths may enable a flexible and controlled data synchronization e.g. the data synchronization may be time dependent e.g. during the day time intervals may be smaller than time intervals during the night because less transactions may be performed during the night than during the day. Upon selecting the next time interval the method steps 201 to 211 and 301 may be repeated using the selected time interval as the current time interval. The selection of the next interval and thus the repetition of the method may for example be performed as soon as steps 201-211 are finished for the current time interval. This may enable a continuous and real time processing of changes in the data processing system. In another example, the repetition may be performed on a period basis. This may enable a controlled and systematic application of the method. Following the example of FIG. 1B, the method steps 201-211 may be repeated in accordance with the method of FIG. 3A for time intervals [CT0, CT1], [CT1, CT2] and [CT2, CT3].

The method of FIG. 2 or 3A may be performed using batch processing. In this batch processing, the log records of the transactions of the current time interval are collected into a group. The whole group (or batch) is then processed as a batch. The transactions may be grouped into batches before they are replicated. The grouped transactions may for example be replicated using a single message (e.g. WebSphere® MQ message). This may reduce CPU consumption at the source database system. In one example, the batch processing may be defined by the number of database transactions that can be grouped together in a message. If that number is 1 it means there is no batching, otherwise e.g. if that number is 128, the batching uses groups of 128 transactions at most. This may particularly be advantageous as in case of small transactions, such as 1 to 3 rows modified per transaction, the batching may reduce CPU overhead that is incurred each time a message is put on a send queue for replication. Transactions are batched in the order that they were committed at the source database system. For example, with a maximum batch size value of 64 KB, the batch might group two transactions of 32 KB each; another batch might group 32 transactions of 2 KB each. The result of using size constraint is better use of messaging bandwidth by sending messages that might average 64 KB in size.

Figure 3B:
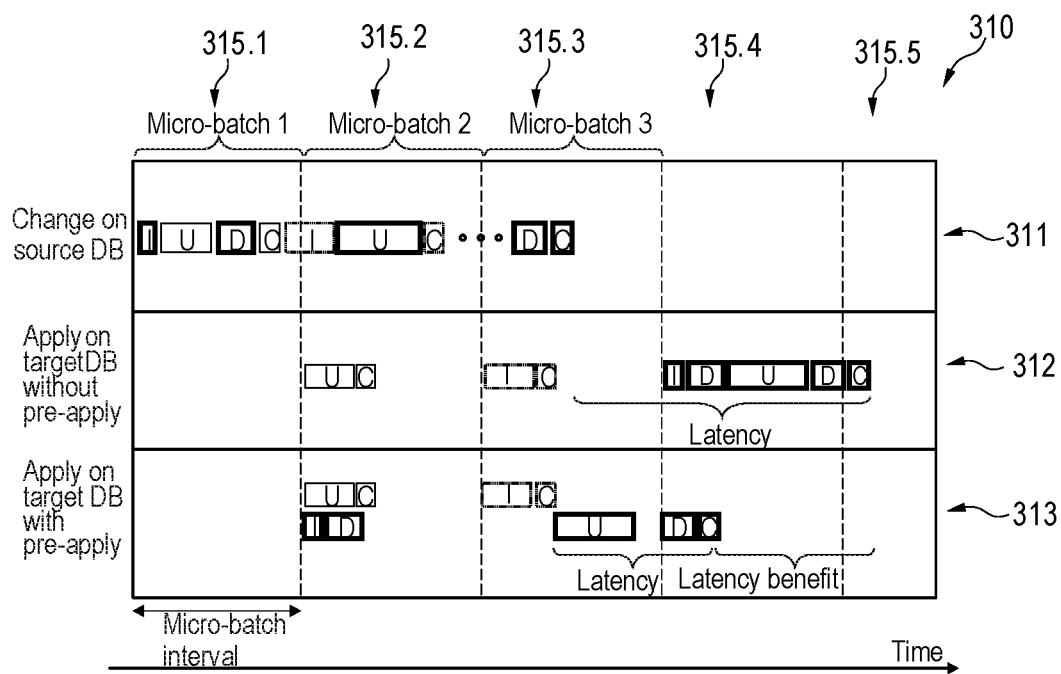
FIG. 3B is a diagram illustrating the execution over time of multiple transactions, in accordance with an embodiment of the invention.

The time intervals used in the method of FIG. 2 or 3 may be time scheduling intervals of the batch processing. The duration of each of the time scheduling intervals may be smaller than a predefined maximum duration. In this case, the batches may be referred to as micro-batches. Following the example of FIG. 1B, the result of the method of FIG. 3A may be illustrated in diagram 310 of FIG. 3B. The diagram 310 is provided in the form of a table having rows illustrating the execution of the transactions T1, T2 and T3 in the source and the target database systems and having columns associated with respective micro-batch intervals 315.1-5.

The first row 311 of the diagram shows the sequence of operations as they are written in the transaction log 106. The sequence of operations represents changes that happen in three different transactions T1, T2 and T3 on the source database. For example, during the first micro-batch interval 315.1, the transaction T2 is started and completed, while the two transactions T1 and T3 have only started e.g. an insert and delete operation of the transaction T1 is performed and an insert operation of the transaction T3 is started.

The second row 312 shows the results of performing the first technique i.e. by applying only committed changes in the target database system. For example, the transaction T2 is applied in the target database system during the second micro-batch interval 315.2, because the commit operation of the transaction T2 is already performed in the first micro-batch interval 315.1. The transaction T3 is applied in the target database system during the third micro-batch interval 315.3, because the commit operation of the transaction T3 is only performed in the second micro-batch interval 315.2. The (long) transaction T5 is however only started in the target database system during the fifth micro-batch interval 315.5, because the commit operation of the transaction T1 is only performed in the third micro-batch interval 315.3.

The third row 313 shows the results of performing the method of FIG. 2 or 3A by applying both committed and uncommitted changes in the target database system. As with the first technique transactions T2 and T3 are applied in the same way because they are short enough that they are completed within a single micro-batch interval. However, the transaction T1 lasts multiple micro-batch intervals, and thus treated differently by the present method. For example, during the micro-batch interval 315.2, the operations that have been performed in the first micro-batch interval 315.1 are executed in the target database system although the commit operation of transaction T1 is not yet performed. This may result in the transaction T1 being ended in the target database system already during the fourth micro-batch interval 315.4. As illustrated in FIG. 3B, the impact on the latency of the long running transaction T1 which has to be applied at once after the commit (by the first technique) is significant. FIG. 3B shows the latency benefit of the present method. In contrast to the first technique, a big part of the transaction T1 was already applied over the time. Once the last delete operation and the transaction commit have been seen (in micro-batch 315.3), those can be applied on the target database system in a short amount of time. Thus, the time for the initial Insert, Delete and Update, could be saved which results in the latency benefit as shown in FIG. 3B.

Figure 4:
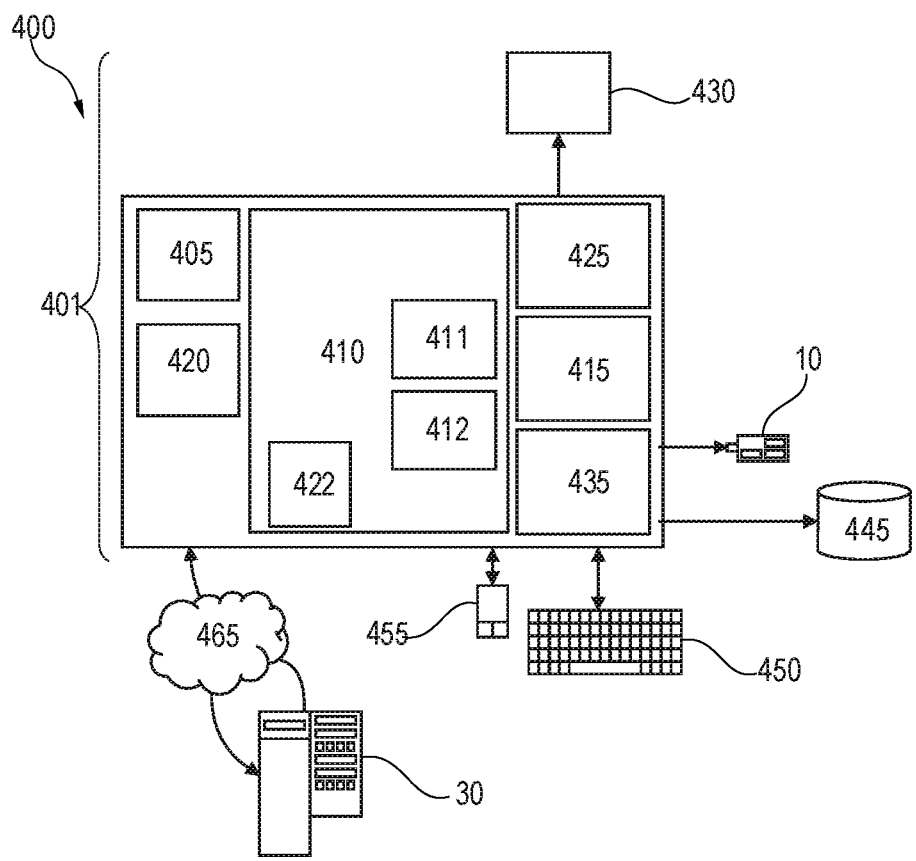
FIG. 4 represents a computerized system, suited for implementing one or more method steps, in accordance with an embodiment of the invention.

FIG. 4 represents a general computerized system 400 such as control system 111 suited for implementing at least part of method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software instructions 412, firmware 422, hardware (processor) 405, or a combination thereof. In exemplary embodiments, the methods described herein are implemented in software, as an executable program, and is executed by a special or general-purpose digital computer, such as a personal computer, workstation, minicomputer, or mainframe computer. The most general system 400 therefore includes a general-purpose computer 401.

In exemplary embodiments, in terms of hardware architecture, as shown in FIG. 4, the computer 401 includes a processor 405, memory (main memory) 410 coupled to a memory controller 415, and one or more input and/or output (I/O) devices (or peripherals) 10, 445 that are communicatively coupled via a local input/output controller 435. The input/output controller 435 can be, but is not limited to, one or more buses or other wired or wireless connections, as is known in the art. The input/output controller 435 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 445 may generally include any generalized cryptographic card or smart card known in the art.

The processor 405 is a hardware device for executing software, particularly that stored in memory 410. The processor 405 can be any custom made or commercially available processor, a central processing unit (CPU), an auxiliary processor among several processors associated with the computer 401, a semiconductor based microprocessor (in the form of a microchip or chip set), a macroprocessor, or generally any device for executing software instructions.

The memory 410 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 410 can have a distributed architecture, where various components are situated remote from one another, but can be accessed by the processor 405.

The software in memory 410 may include one or more separate programs, each of which comprises an ordered listing of executable instructions for implementing logical functions, notably functions involved in embodiments of this invention. In the example of FIG. 4, software in the memory 410 includes software instructions 412 e.g. instructions to manage databases such as a database management system.

The software in memory 410 shall also typically include a suitable operating system (OS) 411. The OS 411 essentially controls the execution of other computer programs, such as possibly software instructions 412 for implementing methods as described herein.

The methods described herein may be in the form of a source program, executable program (object code), script, or any other entity comprising a set of software instructions 412 to be performed. When a source program, then the program needs to be translated via a compiler, assembler, interpreter, or the like, which may or may not be included within the memory 410, so as to operate properly in connection with the OS 411. Furthermore, the methods can be written as an object oriented programming language, which has classes of data and methods, or a procedure programming language, which has routines, subroutines, and/or functions.

In exemplary embodiments, a conventional keyboard 450 and mouse 455 can be coupled to the input/output controller 435. Other output devices such as the I/O devices 10, 445 may include input devices, for example but not limited to a printer, a scanner, microphone, and the like. Finally, the I/O devices 10, 445 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 445 can be any generalized cryptographic card or smart card known in the art. The system 400 can further include a display controller 425 coupled to a display 430. In exemplary embodiments, the system 400 can further include a network interface for coupling to a network 465. The network 465 can be an IP-based network for communication between the computer 401 and any external server, client and the like via a broadband connection. The network 465 transmits and receives data between the computer 401 and external systems 30, which can be involved to perform part or all of the steps of the methods discussed herein. In exemplary embodiments, network 465 can be a managed IP network administered by a service provider. The network 465 may be implemented in a wireless fashion, e.g., using wireless protocols and technologies, such as WiFi, WiMax, etc. The network 465 can also be a packet-switched network such as a local area network, wide area network, metropolitan area network, Internet network, or other similar type of network environment. The network 465 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 401 is a PC, workstation, intelligent device or the like, the software in the memory 410 may further include firmware 422 which may include a basic input output system (BIOS). The BIOS is a set of essential software routines that initialize and test hardware at startup, start the OS 411, and support the transfer of data among the hardware devices. The BIOS is stored in ROM so that the BIOS can be executed when the computer 401 is activated.

When the computer 401 is in operation, the processor 405 is configured to execute software instructions 412 stored within the memory 410, to communicate data to and from the memory 410, and to generally control operations of the computer 401 pursuant to the software. The methods described herein and the OS 411, in whole or in part, but typically the latter, are read by the processor 405, possibly buffered within the processor 405, and then executed.

When the systems and methods described herein are implemented in software instructions 412, as is shown in FIG. 4, the methods can be stored on any computer readable medium, such as storage 420, for use by or in connection with any computer related system or method. The storage 420 may comprise a disk storage such as HDD storage.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for data synchronization between a source database system and a target database system, wherein execution of a database transaction of the source database system is considered to be complete if a processing step followed by an application step of the database transaction is performed, the method comprising:
   identifying in a time interval one or more database transactions of the source database system via a transaction log of the source database system which comprises log records resulting from the one or more database transactions;
   tagging each of the one or more database transactions of the transaction log as a committed or an uncommitted database transaction;
   sending the transaction log to the target database system for implementing changes of the one or more database transactions, wherein prior to the sending log records of the one or more database transactions are transformed according to a data record structure of the target database system, and wherein the transformations comprise changing a format of the log records;
   for each transaction of the identified database transactions, determining, in parallel, whether a transaction was completed based on a tag of the transaction, wherein determining whether the transaction was completed further comprises:
      in response to determining that the transaction is not completed, performing, by the target database system, the processing step of the transaction if a duration time of the transaction exceeds a duration threshold, wherein performing the processing step comprises invoking a respective additional thread of a transaction process of the target database system;
      in response to determining that the transaction is completed and the processing step of the transaction was not previously executed, performing, by the target database system, the processing step and the application step of the transaction, wherein performing the processing step and the application step comprises invoking a main thread of the transaction process; and
      in response to determining that the transaction is completed and the processing step of the transaction was previously executed, performing, by the target database, the application step of the transaction, wherein performing the application step comprises invoking another respective additional thread of the transaction process of the target database system; and
   iteratively performing the identifying, the tagging, and the determining, wherein in each iteration the time interval is a time interval subsequent to a time interval of a preceding iteration, and wherein a length of a subsequent time interval is different from a length of a preceding time interval.

2. The computer-implemented method of claim 1, wherein the processing step comprises beginning the transaction and executing a set of data manipulations of the transaction, and wherein the application step comprises committing the transaction and ending the transaction, and wherein the transaction process executes transactions in the target database system.

3. The computer-implemented method of claim 1, further comprising:
   performing, in accordance with a batch processing having scheduling time intervals, steps of identifying in a time interval one or more database transactions of the source database system and determining whether the transaction was completed.

4. The computer-implemented method of claim 1, wherein a completion of each database transaction for a respective database in the source database system results in a specific content of the respective database, and wherein steps performing, by the target database system, the processing step and/or the application step of the transaction are performed only if a resulting content of each database affected by the transaction in the target database system is one of the specific contents.

5. The computer-implemented method of claim 1, wherein the source database system is configured to perform the processing and application steps for different transactions in a given order taking into account the dependencies between data transactions to prevent data inconsistency, wherein determining whether the transaction was completed further comprises: determining if at least one another transaction of the identified database transactions is dependent on the transaction, and if so performing the steps, in response to determining that the transaction is not completed, performing, by the target database system, the processing step of the transaction and in response to determining that the transaction is completed and the processing step of the transaction was not previously executed, performing, by the target database system, the processing step and the application step of the transaction, if the transaction occurred before the application step of each of the at least one other transaction, otherwise performing the steps, in response to determining that the transaction is not completed, performing, by the target database system, the processing step of the transaction and in response to determining that the transaction is completed and the processing step of the transaction was not previously executed, performing, by the target database system, the processing step and the application step of the transaction, after the step of determining whether the transaction was completed is executed for the other transactions.

6. The computer-implemented method of claim 1, wherein the source database system comprises a transaction log for logging log records resulting from the database transactions of the source database system and a log reader for reading the transaction log, and wherein the source database system buffers read data for enabling change replication to the target database system, and wherein the step, in response to determining that the transaction is not completed, performing, by the target database system, the processing step of the transaction, further comprises controlling the log reader to remove log records resulting from the processing step of said transaction.

7. The computer-implemented method of claim 1, wherein the source database system comprises a transaction log for logging log records resulting from the database transactions, and wherein identifying the database transactions is performed using the transaction log.

8. The computer-implemented method of claim 1, wherein the step, in response to determining that the transaction is not completed, performing, by the target database system, the processing step of the transaction, is only performed if the duration and/or size of the transaction fulfil a predefined condition.

9. The computer-implemented method of claim 1, wherein determining that the transaction is completed comprises determining that the transaction is tagged as a committed data transaction, and wherein determining that said transaction is not completed comprises determining that said transaction is tagged as an uncommitted data transaction.

10. The computer-implemented method of claim 1, further comprising:
  in response to determining that said transaction is cancelled, determining if the step, performing, by the target database system, the processing step of the transaction is performed for the transaction while the step, performing, by the target database, the application step of the transaction, has not been performed and if so causing the target database system to roll back the result of the processing step of the transaction.

11. A computer program product for data synchronization between a source database system and a target database system, wherein execution of a database transaction of the source database system is considered to be complete if a processing step followed by an application step of the database transaction is performed, the computer program product comprising:
  one or more computer-readable tangible storage devices and program instructions stored on at least one of the one or more computer-readable tangible storage devices, wherein the program instructions are executable by a computer, the program instructions comprising:
    program instructions to identify in a time interval one or more database transactions of the source database system via a transaction log of the source database system which comprises log records resulting from the one or more database transactions;
    program instructions to tag each of the one or more database transactions of the transaction log as a committed or an uncommitted database transaction;
    program instructions to send the transaction log to the target database system for implementing changes of the one or more database transactions, wherein prior to the sending log records of the one or more database transactions are transformed according to a data record structure of the target database system, and wherein the transformations comprise changing a format of the log records;
    for each transaction of the identified database transactions, program instructions to determine, in parallel, whether a transaction was completed based on a tag of the transaction, wherein determining whether the transaction was completed further comprises:
      in response to determining that the transaction is not completed, program instructions to perform, by the target database system, the processing step of the transaction if a duration time of the transaction exceeds a duration threshold, wherein performing the processing step comprises invoking a respective additional thread of a transaction process of the target database system;
      in response to determining that the transaction is completed and the processing step of the transaction was not previously executed, program instructions to perform, by the target database system, the processing step and the application step of the transaction, wherein performing the processing step and the application step comprises invoking a main thread of the transaction process; and
      in response to determining that the transaction is completed and the processing step of the transaction was previously executed, program instructions to perform, by the target database, the application step of the transaction, wherein performing the application step comprises invoking another respective additional thread of the transaction process of the target database system; and
    program instructions to iteratively perform the identifying, the tagging, and the determining, wherein in each iteration the time interval is a time interval subsequent to a time interval of a preceding iteration, and wherein a length of a subsequent time interval is different from a length of a preceding time interval.

12. A computer system for data synchronization between a source database system and a target database system, wherein execution of a database transaction of the source database system is considered to be complete if a processing step followed by an application step of the database transaction is performed, the computer system comprising:
  one or more processors, one or more computer-readable memories, one or more computer-readable tangible storage devices, and program instructions stored on at least one of the one or more computer-readable tangible storage devices for execution by at least one of the one or more processors via at least one of the one or more memories, the program instructions comprising:
    program instructions to identify in a time interval one or more database transactions of the source database system via a transaction log of the source database system which comprises log records resulting from the one or more database transactions;
    program instructions to each of the one or more database transactions of the transaction log as a committed or an uncommitted database transaction;
    program instructions to send the transaction log to the target database system for implementing changes of the one or more database transactions, wherein prior to the sending log records of the one or more database transactions are transformed according to a data record structure of the target database system, and wherein the transformations comprise changing a format of the log records;
    for each transaction of the identified database transactions, program instructions to determine whether the transaction was completed based on a tag of the transaction, wherein determining whether the transaction was completed further comprises:
      in response to determining that the transaction is not completed, program instructions to perform, by the target database system, the processing step of the transaction if a duration time of the transaction exceeds a duration threshold, wherein performing the processing step comprises invoking a respective additional thread of a transaction process of the target database system;

in response to determining that the transaction is completed and the processing step of the transaction was not previously executed, program instructions to perform, by the target database system, the processing step and the application step of the transaction, wherein performing the processing step and the application step comprises invoking a main thread of the transaction process; and in response to determining that the transaction is completed and the processing step of the transaction was previously executed, program instructions to perform, by the target database, the application step of the transaction, wherein performing the application step comprises invoking another respective additional thread of the transaction process of the target database system; and program instructions to iteratively perform the identifying, the tagging, and the determining, wherein in each iteration the time interval is a time interval subsequent to a time interval of a preceding iteration, and wherein a length of a subsequent time interval is different from a length of a preceding time interval.

13. The computer system of claim 12, being remotely connected to the source database system and the target database system.

14. The computer system of claim 12, wherein the source database system implements a change data capture system.

15. The computer system of claim 12, wherein the target database system implements a change data capture system.

* * * * *